United States Patent [19]

Weeks

[11] Patent Number: 5,188,309

[45] Date of Patent: Feb. 23, 1993

[54] TETHER KEEPER FOR VIDEOTAPE CARTRIDGE ADAPTOR

[75] Inventor: Jerrold K. Weeks, Hudson, Wis.

[73] Assignee: Minnesota Mining and Manufacturing Company, St. Paul, Minn.

[21] Appl. No.: 690,626

[22] Filed: Apr. 24, 1991

[51] Int. Cl.⁵ .................... G11B 23/087; G11B 23/00; G11B 17/00

[52] U.S. Cl. .................................. 242/199; 242/195; 360/132

[58] Field of Search ................ 242/199, 195; 360/132

[56] References Cited

U.S. PATENT DOCUMENTS

| | | | |
|---|---|---|---|
| 3,227,387 | 1/1966 | Laa et al. | 242/55.13 |
| 3,934,840 | 1/1976 | Inaga | 242/195 |
| 4,432,508 | 2/1984 | Inoue et al. | 242/195 |
| 4,477,851 | 10/1984 | Dalziel et al. | 242/195 |
| 4,555,077 | 11/1985 | Platter | 242/198 |
| 4,572,460 | 2/1986 | Hertrich | 242/195 |
| 4,832,284 | 5/1989 | Inoue | 242/195 |
| 4,920,436 | 4/1990 | Novak | 242/199 |
| 5,031,065 | 7/1991 | Flor et al. | 242/195 |
| 5,034,842 | 7/1991 | Turgeon | 242/195 |
| 5,082,196 | 1/1992 | Turgeon | 242/199 |

Primary Examiner—Daniel P. Stodola
Assistant Examiner—John Q. Nguyen
Attorney, Agent, or Firm—Merchant, Gould, Smith, Edell, Welter & Schmidt

[57] ABSTRACT

An adaptor of the type used to convert a tape cartridge to a cassette format. The adaptor uses a tether to guide tape from the supply reel to the take-up reel. The adaptor has a tether keeper assembly which is used: to position the tether for mating engagement with the tape connector; to retain the tether assembly while the cartridge is out of the adaptor; and to release the tether during the insertion of the cartridge into the adaptor.

4 Claims, 8 Drawing Sheets

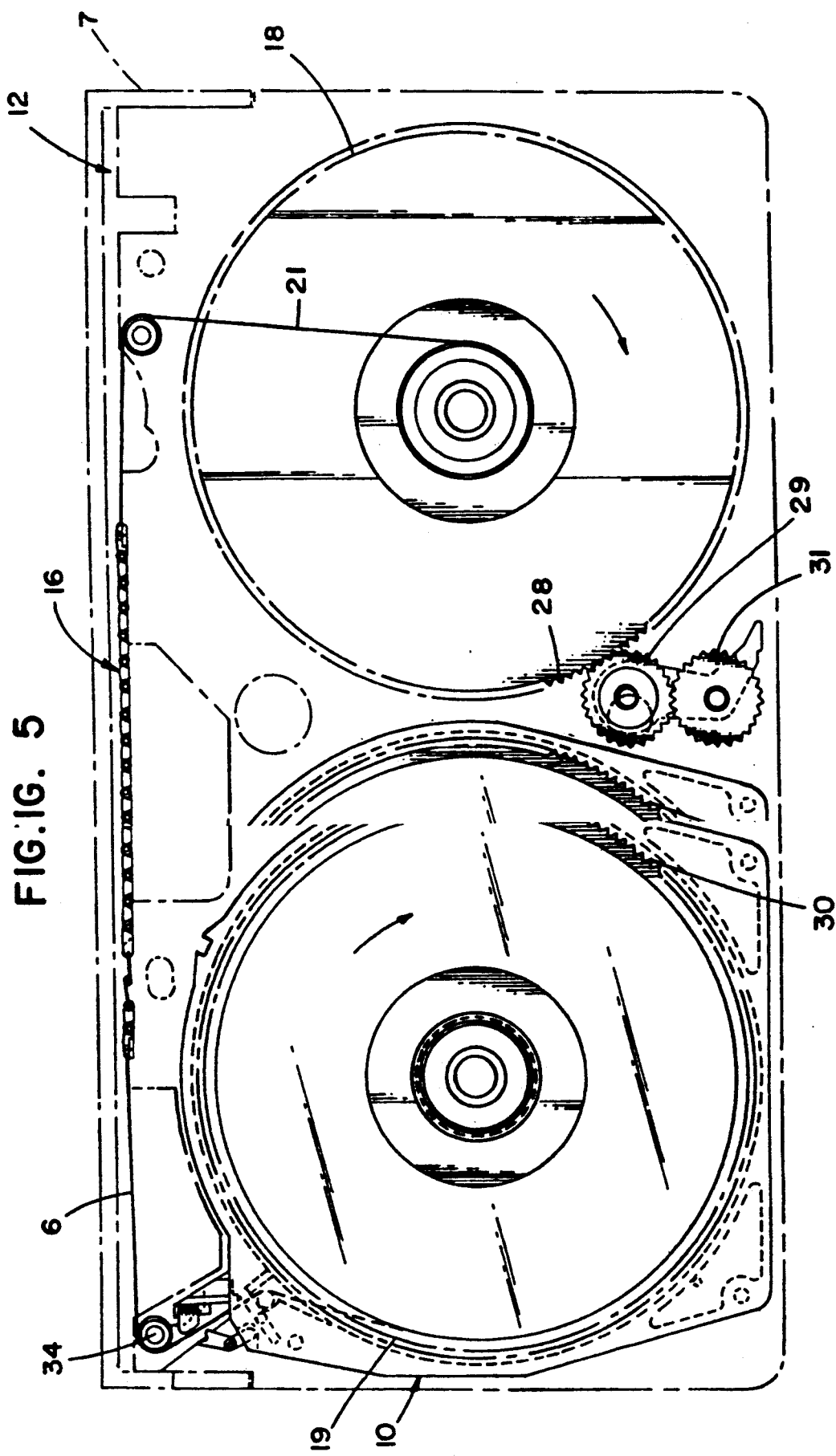

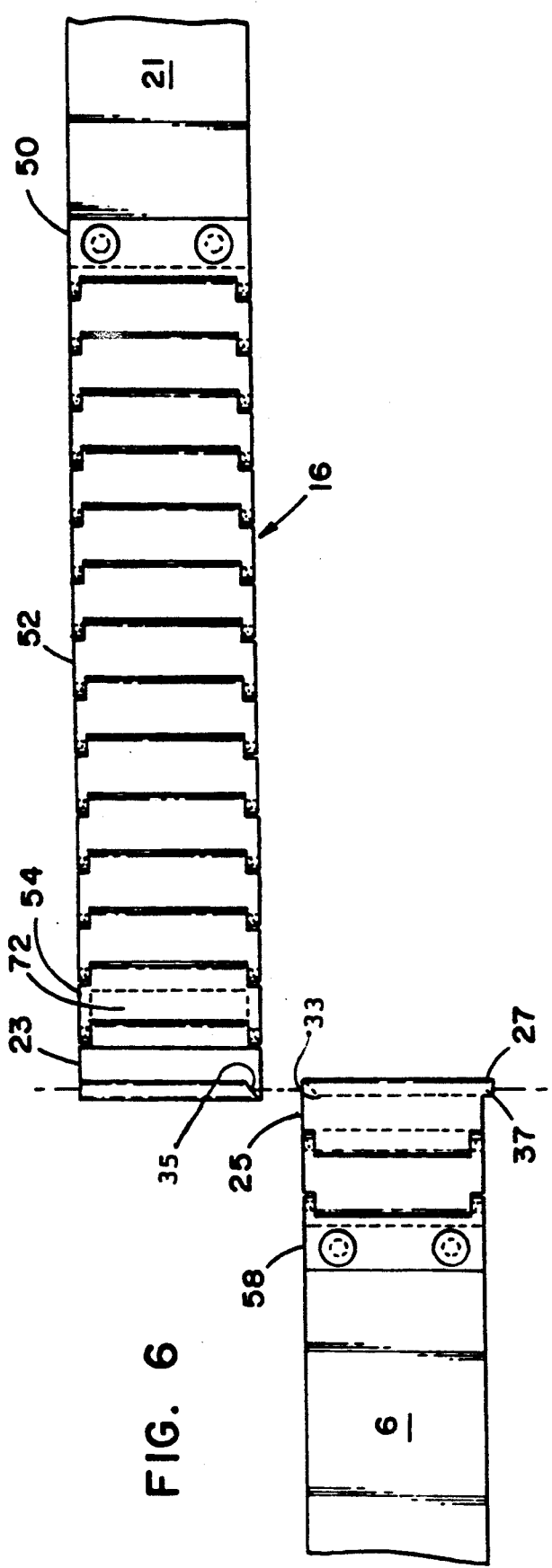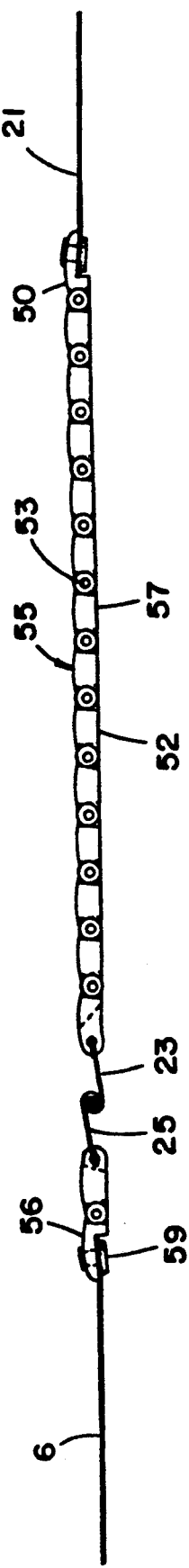

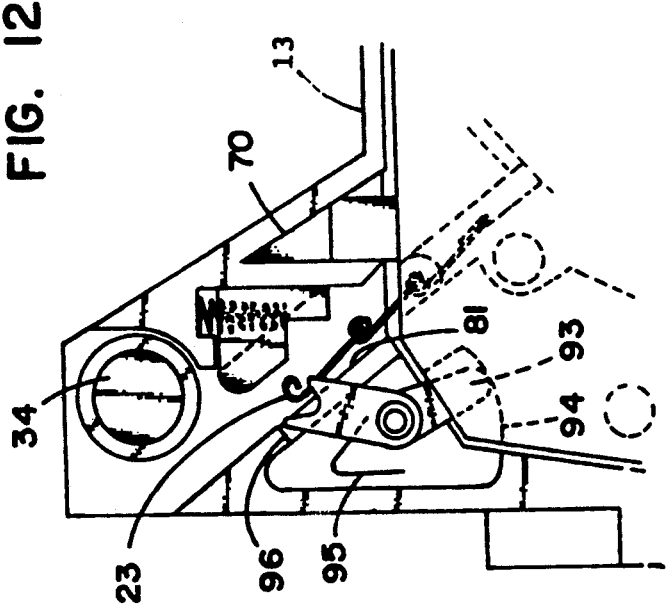
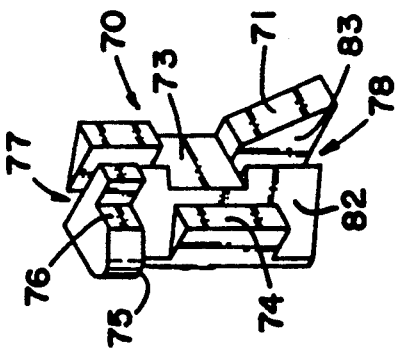
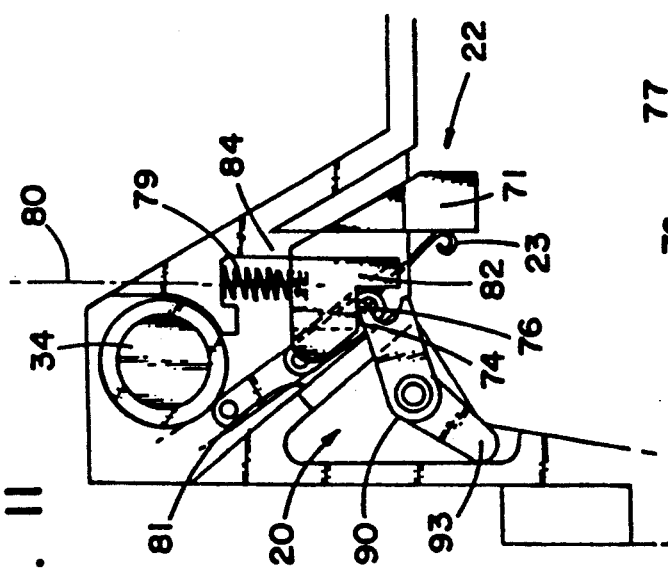

TETHER KEEPER FOR VIDEOTAPE CARTRIDGE ADAPTOR

BACKGROUND OF THE INVENTION

1. Field of the Invention

The present invention relates to a two-piece video cassette which consists of a videotape cartridge for use with a videocassette adaptor. In operation, the tape cartridge is inserted into the cassette adaptor. The insertion of the cartridge into the adaptor connects the tape to a tether assembly, located in the adaptor. Next the user activates mechanical winding mechanisms in the adaptor to advance the tether assembly, and the attached tape, from the supply reel to the take-up reel. In this way, the tape is advanced toward and loaded onto the take-up reel. After these events the adaptor has been properly configured and the two-piece videocassette may be used in conventional videotape equipment designed to accept industry standard videocassettes.

More particularly, the invention is directed to a keeper structure for use in the adaptor. The keeper retains and positions a self supporting band and attached interconnector to facilitate alignment of interconnector structures. The keeper also releases the tether band when the cartridge is inserted into the adaptor.

2. Description of the Prior Art

It has become common to use magnetic recording media supplied in a cassette format. The traditional cassette format includes a supply reel and a take-up reel. The tape is supplied on the supply reel. One end of this tape is permanently attached to this supply reel and the other end of the tape is permanently attached to the take-up reel. In the cassette, the supply reel and the take-up reel share the same housing, and in use the tape is transported between the two reels. This packaging strategy is inefficient for tape storage due to the inclusion of an empty reel in the package. In applications such as video cameras the adoption of the cassette format has reduced the amount of tape available for use and has required the development of specialized cassette to cassette adaptors.

For example, adaptors which convert one cassette format to another cassette format are widely known and used as evidenced by U.S. Pat. No. 4,544,970 to H. Ogata, which teaches an adaptor or carrier which converts a miniature format videotape cassette to the standard VHS format. This type of apparatus is used to provide VHS playback capabilities for consumer videotape cameras.

It has been proposed to supply magnetic recording media in a more compact and space efficient cartridge format. In the cartridge format, the housing contains a single supply reel for storing tape. The "free" end of the tape must be threaded or other wise attached to a remote take-up reel.

Tape cartridges of various types have been in common use for storing magnetic media as evidenced by U.S. Pat. No. 4,826,101 to J. A. Smith, which teaches a single reel supply cartridge for storing magnetic tape. This type of cartridge is used in the computer industry.

Single reel cartridge coupled with an adaptor for converting a cartridge format to a cassette format are also known as evidenced by U.K. Patent Application No. 2,217,684 A to R. L. Davis as inventor.

Another example of such cartridge to cassette adaptors is known from U.S. Pat. No. 4,920,436 to Novak. Novak teaches, inter alia, a carrier or adaptor which is used to adapt a videotape cartridge to an industry standard videocassette format.

Structures present in Novak include a take-up reel and a tether coupled to the hub of the take-up reel. The tether is guided across the front of the carrier, defining a tape path. In operation, the user inserts the cartridge into the carrier, automatically coupling the tape connector to the tether connector. In Novak, the connection between the tape connector and the tether connector is accomplished by a resilient clasp which makes a positive connection between the tape and the tether. In Novak the tether assembly is very flexible and is not self-supporting.

SUMMARY OF THE INVENTION

In contrast to the prior art, in the present invention, the tether connector is retained by a keeper structure with is released by a cam action when the cartridge is seated in the adaptor.

In use, the tether assembly is clamped into position, against the housing by a spring loaded keeper block. This structure locates the tether connector in the "home" position were it intercepts the tape connector when the cartridge is seated in the cartridge. The connection between the tether and tape connectors is initiated prior to the release of the keeper mechanism. The external shape of the cartridge interacts with a cam portion of the keeper block and fully releases the tether as the cartridge becomes fully seated.

The keeper block itself, is located by ribs formed in the housing of the adaptor which restrict the block to essentially linear motion. The block has a collection of surfaces which perform various functions. For example the block has a shoulder which mates with a corresponding notch in the tether assembly accurately locating the tether connector link in space. The notch also forces the tether connector itself to rotate into abutment with a surface on the keeper block providing a resilient yet stable and repeatable position for the tether connector.

BRIEF DESCRIPTION OF THE DRAWINGS

Throughout the figures, identical reference numerals refer to identical structural elements, wherein:

FIG. 5 is a schematic plan view of the cartridge/adaptor combination depicting the tether assembly along the path at a position intermediate between the "home" and "ready-run" positions;

FIG. 6 is a side view of the tether assembly;

FIG. 7 is a elevation of the tether assembly;

FIG. 11 is a plan view of a portion of the adaptor housing showing the tether keeper in the "locked" position and showing the cartridge lock arm in the "released" position;

FIG. 12 is a plan view of a portion of the adaptor showing the tether keeper in the "released" position and showing the cartridge lock arm in the "locked"

FIG. 13 is a perspective view of the tether keeper block;

Description of the Preferred Embodiment

Overview of Operation

Figure 1:
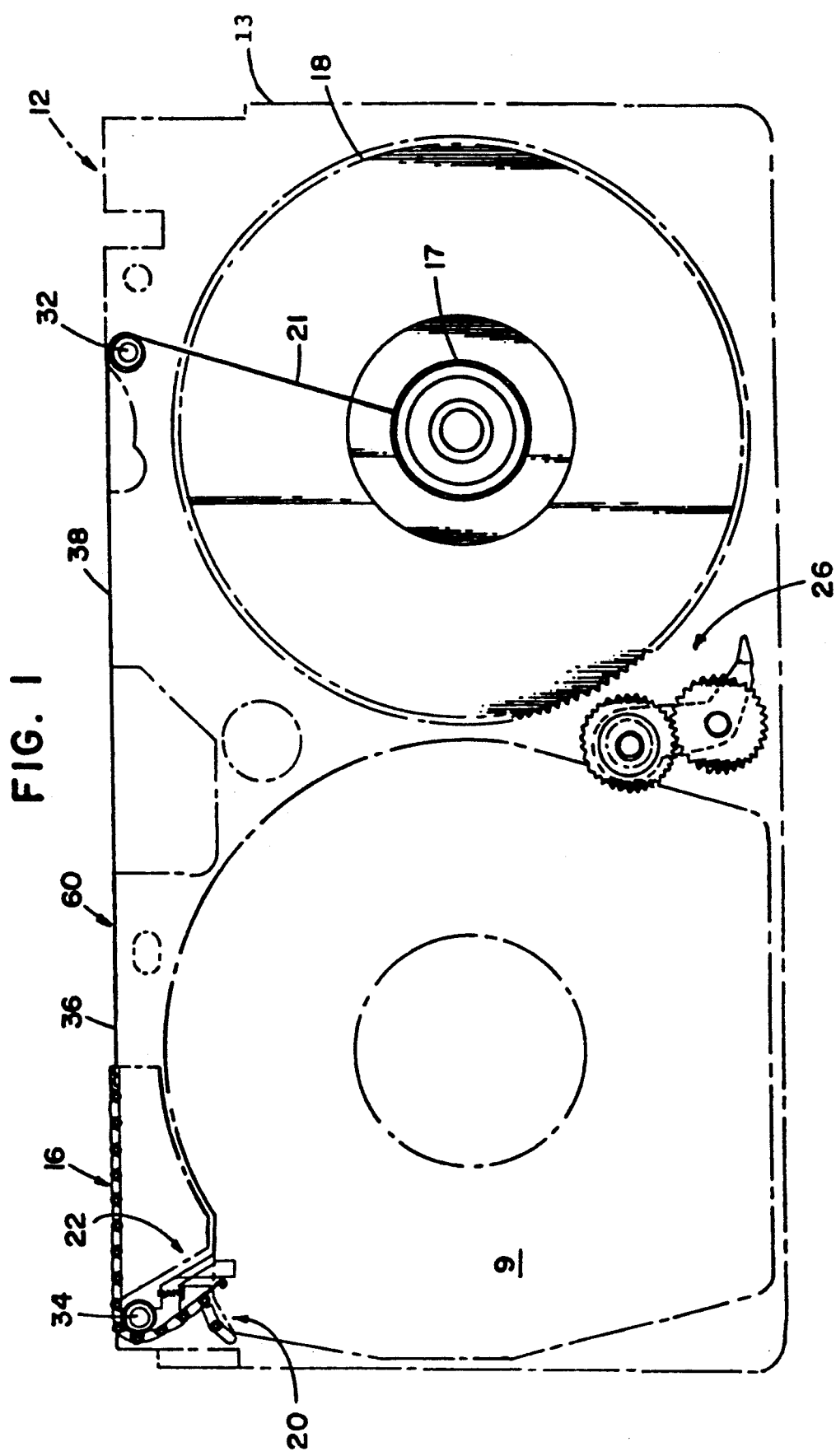
FIG. 1 is a schematic plan view depicting the adaptor, without the companion cartridge.
Figure 2:
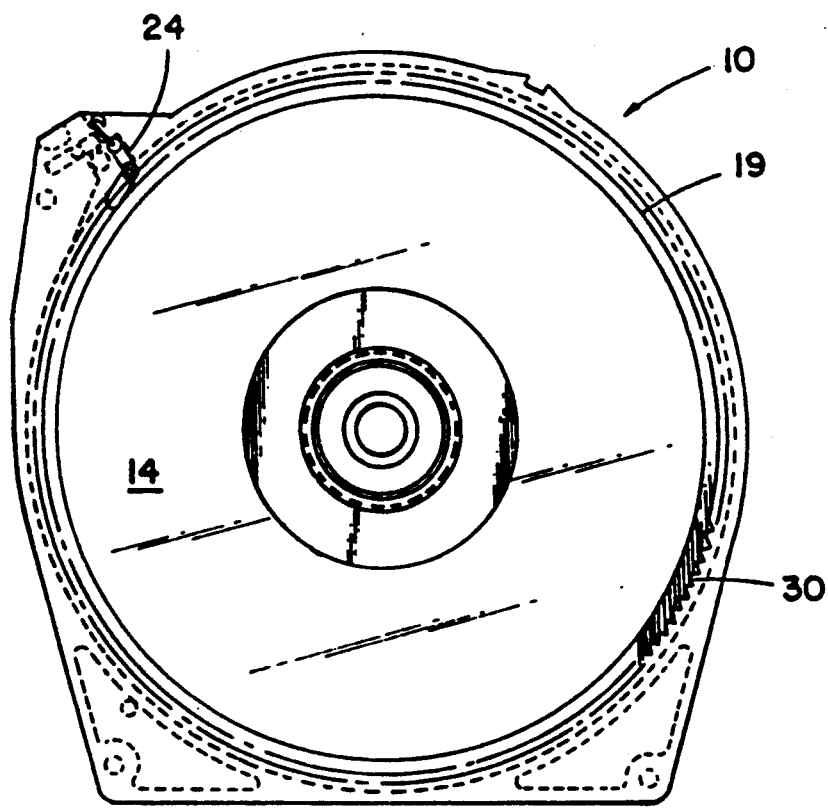
FIG. 2 is a schematic plan view of the cartridge, without the companion adaptor.
Figure 3:
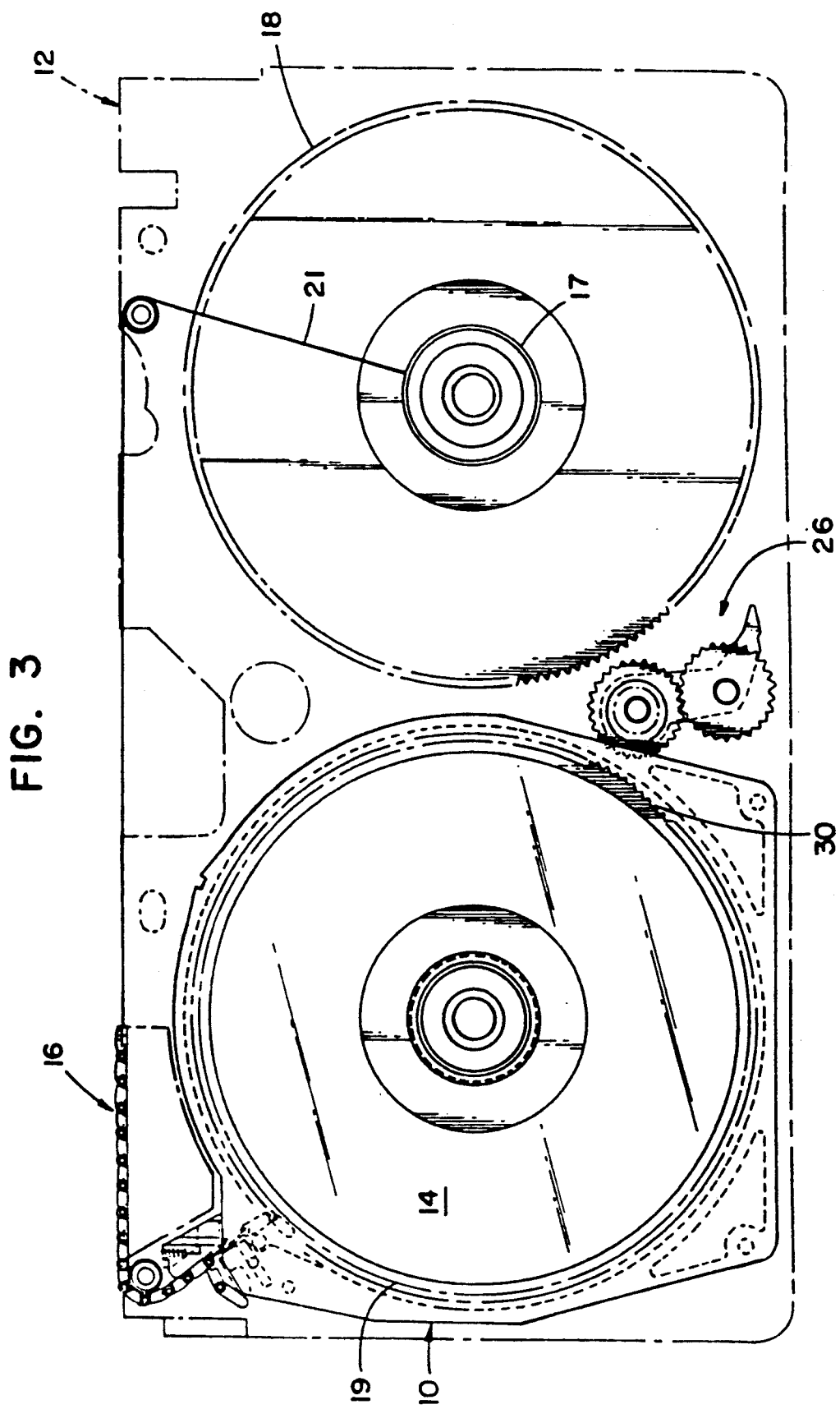
FIG. 3 is a schematic plan view of the cartridge, inserted into the adaptor forming a cartridge/adaptor combination, which depicts the tether assembly in the "home" position.
Figure 4:
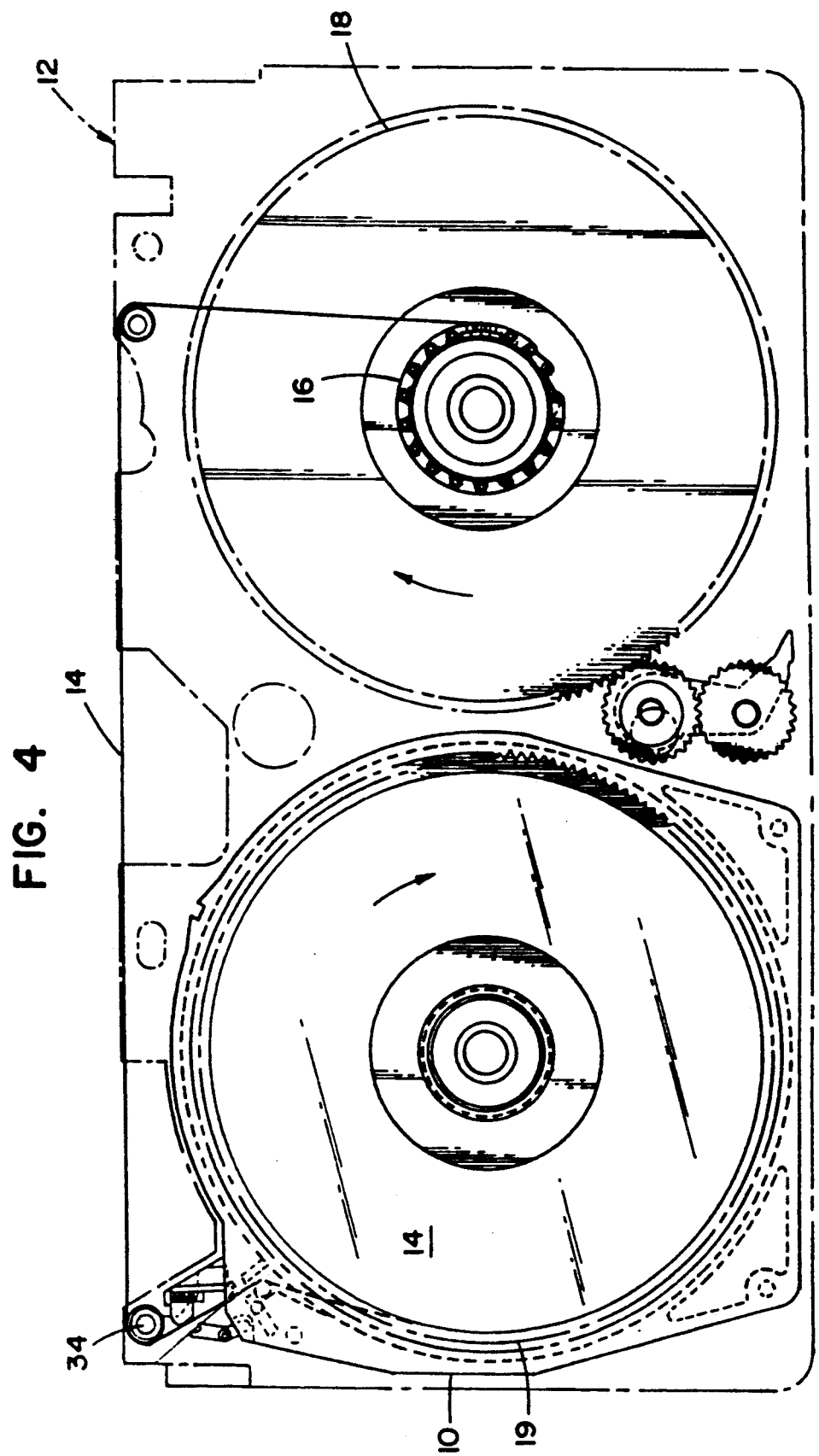
FIG. 4 is a schematic plan view of the cartridge/adaptor combination depicting the tether assembly in the "ready-run" position.

In general, and with reference to FIG. 1 and FIG. 2, the user inserts the cartridge 10 into the carrier or adapter 12, forming a composite two-piece structure. The composite structure is shown in FIGS. 3-5. This composite structure mimics the operation of a standard T-120 VHS video cassette when used in commonly available video tape machines.

The process of inserting the cartridge 10 into the cartridge cavity 9 of the adaptor 12 automatically connects the tape 14 in the cartridge 10 with a tether assembly, which is located in the adaptor and which is generally designated 16. This tether assembly 16 is used to pull the tape 14 from the cartridge 10; guide it across the tape path; and ultimately, to load it upon the take-up reel 18.

In FIG. 3, the cartridge 10, is shown completely seated within the cartridge cavity 9 in adaptor 12. Once the cartridge 10 is in the adaptor 12, the user may use an integral winder mechanism to advance the tether assembly 16 from the "home" position near the cartridge cavity 9, to a "ready-run" position, where the tape has been lead out of the cartridge 10 and the interconnection hardware has been loaded on to the take-up reel 18. The winder mechanism drives the clapper gear assembly 26, which may selectively engage either the take-up reel 18 or the supply reel 19.

In the "home" position the tether assembly 16 is positioned for mating engagement with a cooperating tape connector 25, carried in the cartridge 10. The tether assembly 16 is depicted in the "home" position in both FIG 1, and FIG. 3.

In the "ready-run" position, the tether assembly 16 is wound onto the take-up reel 18 forming a winding surface for storing tape. In FIG. 4 the tether assembly 16 is shown in the "ready-run" position.

In FIG. 5 the tether assembly 16 is shown in an intermediate position, midway along the tape path between the "home" position and the "ready-run" position.

When the adaptor 12 has placed the tape 14 in the "ready-run" position the adaptor 12 and cartridge 10 are ready for use. However while the tether connector 33 is in the "home" position or any intermediate position depicted in FIG. 5, attempts to use the adaptor 12 could result in damage to the videotape machine.

Several interlock structures and functions are directed toward preventing improper use of the adaptor 12. A number of these structures facilitate the trouble-free use of the cartridge 10 with the adaptor 12.

Returning to FIG. 1, there is shown a cartridge lock assembly 20 which cooperates with the cartridge 10 to ensure that the cartridge 10 may not be accidentally removed from the adaptor 12 while the tape 14 is outside of the cartridge 10. This structure resides in the adaptor and is generally designated 20.

A tether connector keeper assembly 22 is also provided in the adaptor 12 to retain and locate the tether assembly 16 at the pre-determined "home" location adjacent the cartridge cavity 9. This structure 22 defines the "home" position and is used to facilitate connection between the tape and tether. The tether connector keeper assembly is located in the adaptor and is generally designated 22.

A tape connector keeper 24 structure is also provided to locate the tape connector within the cartridge 10, while the cartridge 10 is outside the adaptor 12 as shown in FIG 2. This tape connector keeper structure is located within the cartridge 10 and is generally designated 24, and is depicted in FIG. 2.

In general, it is preferred that the cartridge follow an arcuate path as it is inserted into the adaptor. This may be achieved by providing a hinged door structure on the adaptor 12, which accepts and retains the cartridge in a door pocket. As the door is rotated into the closed position the cartridge follows a preferred arcuate path.

The preferred arcuate insertion path provides sequential activation of a number of cartridge and adaptor features. For example, it is preferred that the interconnectors intersect and mate prior to firmly seating the cartridge in the adaptor. It is also desired that cartridge be fully seated in the adaptor prior to the release of the cartridge lock assembly 20, shown in FIG. 1.

It is preferred that the cartridge, itself, automatically release the tether connector keeper 22 as the cartridge becomes fully seated in the adaptor. Reference may be had to either U.S. patent application 07/482,071 issued as U.S. Pat. No. 5,072,325, filed 02/20/90 or U.S. patent application No. 07/481,986 filed 2/20/90, each of which is incorporated by reference herein, for further information regarding door structures which provide the preferred arcuate insertion functions and structures.

Once the cartridge is fully seated, mechanical winding mechanism may used to transport the tether assembly between the home position and the ready-run position. As previously described a manually operated winder is included in the adaptor to operate the clapper gear assembly structures, generally designated 26. The clapper gear 29, in turn may be oriented to drive either the take up reel 13 or the supply reel 19. For example, the clapper gear 29 may be engaged with the lower gear form flange 28 of the take up reel 18, as shown in FIGS. 4 and 5. Power delivered by the transfer gear 31 will advance the tether assembly 16 to the "ready-run" position. In a similar fashion, the clapper gear assembly 26 may be moved into engagement with the lower gear form flange 30 of the supply reel 19, as shown in FIG. 3, and power supplied by the transfer gear 31 to drive the tether assembly 16 toward the "home" position.

The remainder of the manually operated winder has not been depicted to clarify and simplify the drawings. Reference may be had to U.S. patent application No. 07/481,986 filed 02/20/90 which is incorporated by reference herein, for further information regarding winder structures which may be used to provide the power to operate the clapper gear structures.

At the conclusion of play, the cartridge tether assembly 16 is rewound, to return the tether to the "home" position depicted in FIG. 1 and FIG. 3.

Re-entry of the tape connector 25 into the cartridge 10 releases the cartridge lock assembly 20. At this point the cartridge 10 may be removed on the arcuate path defined by the adaptor 12. In general, rotational force supplied by the user to the cartridge 10, causes it to rotate out of the cartridge cavity 9, which in turn, causes the tether connector 23 to be recaptured by the tether connector keeper 22, and which, causes the tape connector 25 to be recaptured by the cartridge.

At this point, the user may remove the cartridge 10 from the adaptor 12.

Detailed Description of the Tether Band

The tether band performs several functions. The tether band makes, supports and guides the interconnection across the tape path. The tether band has a length which is substantially equal to the circumference of the core or hub of the take-up reel and as a consequence wraps completely around the hub forming a tape winding surface. This aspect permits relatively low tolerance over leader length and obviates the need for an indexed hub keyed to accept a tether like structure.

As described above, the tether assembly 16 mates with the tape connector 25 upon cartridge insertion, forming a non clasping, and zero insertion force, single axis interconnection. The tether band draws the tape 14 from the cartridge 10 across the tape path. The cantilever nature of the tether band, prevents the single axis interconnection from separating along the tape path. The tether band winds over the tether forming a winding surface for tape storage.

The term "tether assembly", refers to all the structures extending from the take-up reel hub to and including the tether connector 23. The term "tether band" refers to the self supporting band comprising the collection of hinged links 50,52 and 54. The term "tether" in isolation refers to the flexible film leader between the tether band and the hub.

Figure 9:
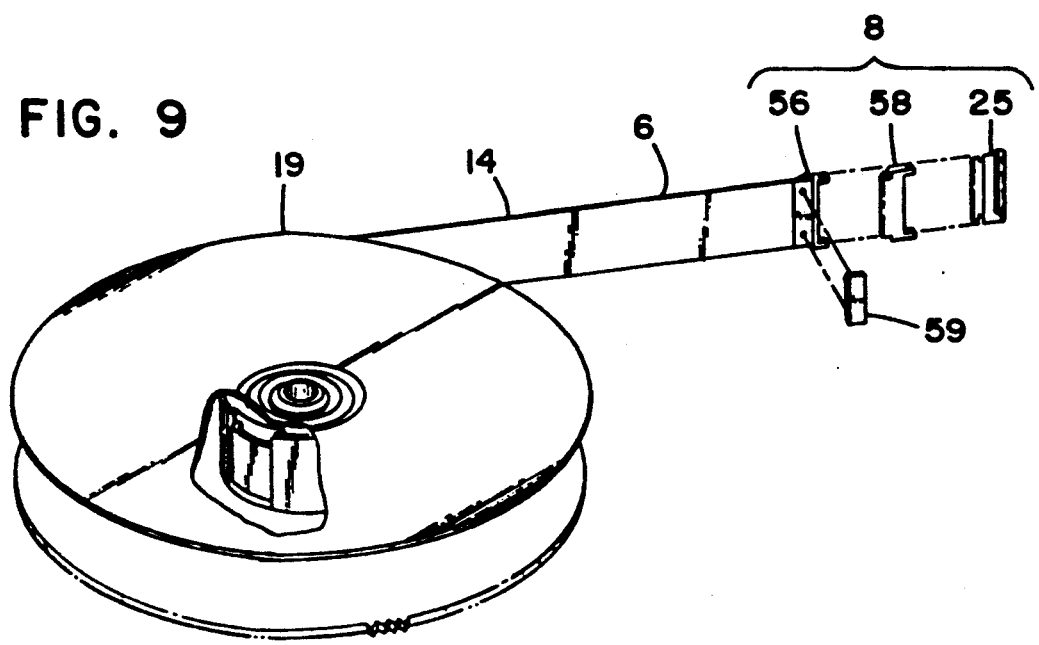
FIG. 9 is a perspective view of the supply reel assembly.

FIG. 9 illustrates the attachment of the leader or tether 21 to the hub of the take-up reel 18. Typically, the leader 21 will be formed from a transparent plastic film in order to operate with certain optical sensors used in conventional videocassette.

As shown in the figure, the leader 21 is also coupled to a specialized tether attachment link 50. This specialized link 50 along with the path links 52, form the self supporting or cantilever tether band.

FIG. 9 shows the corresponding tape cartridge structures to mate the tape 14 with the tether band 16. One end of the tape 14 is anchored to the hub of the supply reel 19. The other end of the tape is terminated with a tape connector 25. Typically a transparent film leader 6 will be provided between the tape 14 and the connector assembly. The tape connector 25 is coupled to the tape through a tape connector link 58 and a tape attachment link 56.

Figure 8:
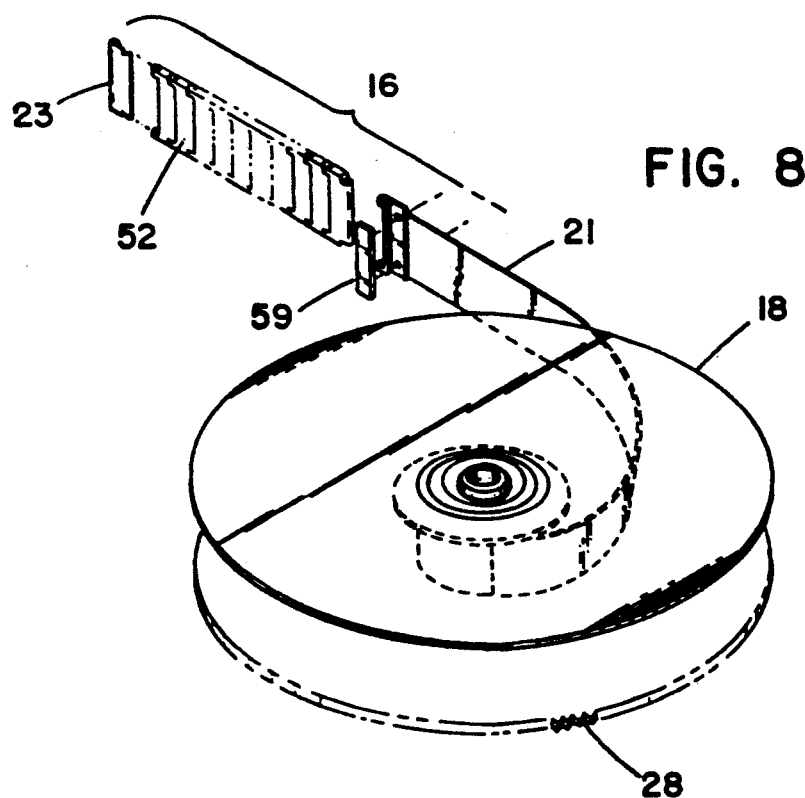
FIG. 8 is a perspective view of the take-up reel assembly.

The tape attachment link 56 and the tether attachment link 50 are terminated with identical clip structures 59 for attaching the links to the tape 14 and the leader 21. The clip structures 59 are shown in FIG. 8 and include stakes that are passed through the tape 14 and leader 21 to form a durable connection although other attachment means may be adopted.

Turning to FIG. 6 and 7, each path link 52 is hinged to its neighbor through the use of hinge pins 53. As an aid to automated assembly it is preferred to use two hinge pins per link as shown. In this configuration the band may freely flex or bend in the plane which contains the axis of the hinge pins. However the tolerance of the hinges are such that only minimal bending in the plane orthogonal to the hinge pins is permitted. The path links have a slightly convex upper surface 55, and a slightly concave lower surface 57. When the links are wound around the hub of the take-up reel 17 they form a segmented but substantially cylindrical surface to receive the tape 14. One advantage of this structure is that only the length of the free standing band need be controlled to a high precision to ensure the generation of an appropriate winding surface. The tether length is less critical and may have a higher tolerance than, would otherwise be permitted.

Figure 10:
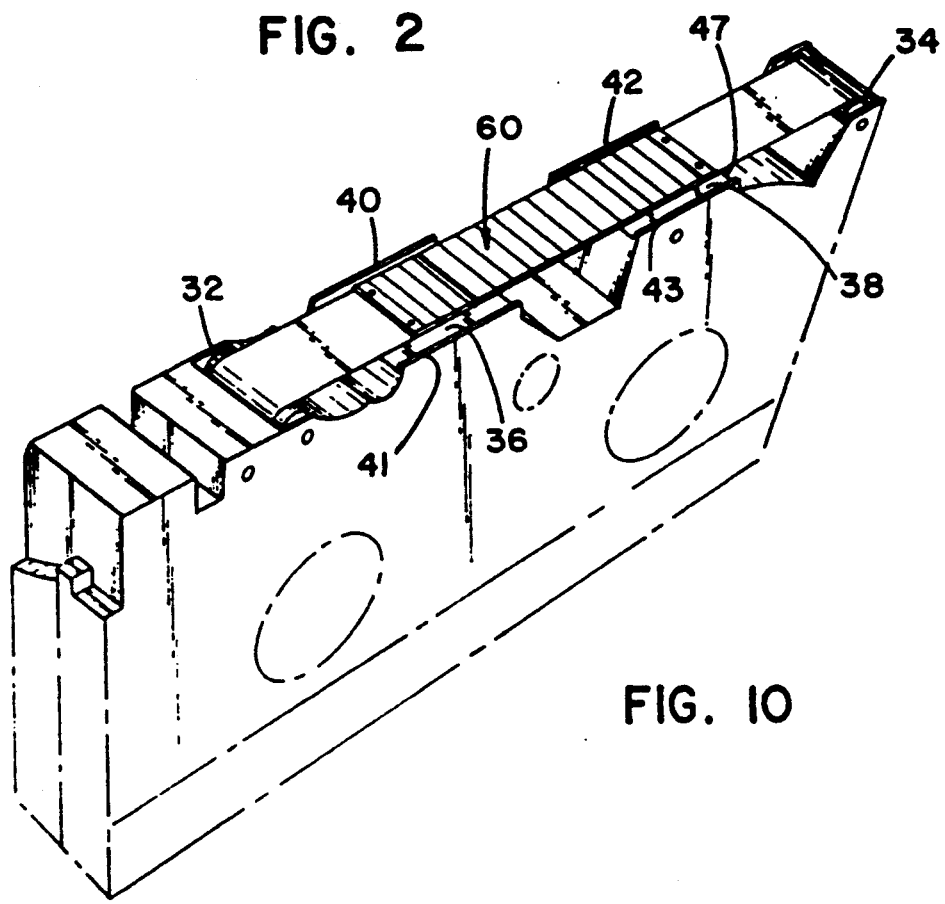
FIG. 10 is a perspective view of the tape channel formed in the adaptor housing.

This free standing band cooperates with the tape path channel 60. The tape channel is the passage formed between the rear surface of the tape access door 7 and the front of the housing shown in perspective view in FIG. 10, and in plan view in FIG. 5. This channel extends from the take-up side post 32 to the supply side post 34. The tape path plane is defined by lands 36 and 38 and the periphery of the posts 32 and 34. The channel has several wall sections labeled 40–43 in FIG. 10. The channel 60 cooperates with the band 16 to guide the interconnection formed between connector 23 and connector 25 across unsupported sections of the tape path designated 44,45 and 46 in the figures.

When the tether band assembly is in the "home" position a large segment of the band extends from the tether connector keeper to the edge of the first land 36. It is desirable to have at least a portion of a link within the channel 60 so that the walls 42 and 43 locate and confine the edges of the band. However in general the minimum length of the band is determined by circumference of the take-up reel hub 17.

Detailed Description of the Interconnector Structures

Robust and reliable interconnection between the tape and the tether is required for product success. Prior art double axis connectors known from Novak rely on a positive clasp which elastically deforms to mate the tape with the tether. This elastic deformation is undesirable since inevitable wear will reduce the reliability of the connection. Another defect in the prior art system is the fact that tension on the interconnection structures is required to release the interconnectors from the their spring loaded jaws which also leads to undesirable wear.

In the present invention, the scroll form complimentary tubular structures of connector 23 and 25 mate with essentially zero force and form a single axis interconnector which is less prone to wear.

The tape connector 25 has a beveled surface 33, as does the tether connector 23 shown at 35. These features, form entry zones which interact and force the tubular members to align axially. This guiding function is capable of making a reliable connection as long as the circumferential tubular members intersect. This greatly reduces alignment requirements which is beneficial. In operation the first tubular tape connector can be moved or displaced along the axis to engage and mate with the second tubular tether connector. In this fashion the two tubular members overlap forming a substantially tubular interconnector which has only one axis, for rotation around guide posts 32 and the like. To prevent the interconnectors from falling through each other it is desirable to plug one connector as is shown by plug 37 in FIG. 6.

Detailed Description of the Tether Keeper

The purpose of the tether connector keeper is to locate and position the tether connector 23 so that it may mate with the tape connector 25 when the cartridge is inserted into the adaptor. The tether keeper also holds the tether assembly 16 in the "home" position while the cartridge is removed from the adaptor.

The tether connector keeper 22 shown in FIG. 12, includes a spring loaded keeper block 70. This block 70 is located in the adaptor housing 13, and may slide along a path indicated by the axis 80 of spring 79. A pair of cooperating ribs 84 and 85, formed in the housing 13 guide the block. These ribs or walls, overly each other in the FIG. 12 and are shown in phantom line in the drawing of FIG. 12, while rib 85 is shown in isolation in FIG. 13. These ribs cooperate with lower slot 78 and upper slot 77 formed in the block 70, to provide appropriate guiding and load bearing surfaces for the block 70.

The compression spring 79 urges the block 70 into abutment with the tether connector 23 and tether connector link 58. In general, movement of the block along path defined by the slots 77 and 78 controls the width of the space formed between housing surface 81 and block surface 82.

The various surfaces of the block 70 perform different functions. For example the flat 74 directly contacts a complimentary shaped surface on the tether connector link 54. This action clamps the link 54 thus wedging it against the housing surface 81. The notch surface abuts the tether connector 23 itself and forces it to rotate into abutment with planar surface labeled 83 in FIG. 13. This planar surface forms on surface of the slot 83 and the circular section of the tether link rests against it when the tether assembly is in the "home" position.

Although the block is free to slide in the housing, it is relatively large and well supported by the housing. The over hang surface 75 of the keeper block 70 comes to rest over the tether connector 23. This surface 75, prevents the tether connector 23 and the rest of the tether assembly from being lifted out of position by the removal of the cartridge from the adaptor, and any drag force associated with cartridge removal is transferred directly to the block which can accommodate these forces without failure.

The square notch 76, prevents the rotation of the cartridge lock arm 90 from pivoting about pivot 91, while tether connector is in the "home" position.

The ramp 71 forms a cam surface which is activated by the cartridge as it is pressed into position in the adaptor.

As the cartridge moves into the seated position the tether connector mates with the tape connector 25. As the cartridge housing 11 contacts the ramp 71, it forces the block 70 to retract. The retraction process releases the tether connector 23 and the tether connector link 58.

The notch or cut-out 73 provides clearance for the optical control path in that area.

This construction accurately positions the tether connector to predetermined and known location, by clamping the connector 23 against a keeper surface, and by clamping the tether connector link 54 against a housing surface.

This construction also utilizes cartridge housing motion to positively release the tether connector from the cartridge. This strategy minimizes stress and wear on the relatively fragile tether and tape connector structures.

Although this invention has been described in the context of the best mode adaptor structures it should be appreciated that keeper clamp can be used as a part of a specialized tape transport designed to directly accept the cartridge directly without a adaptor.

What is claimed is:

1. A two-piece videocassette of the type formed by the insertion of a cartridge (10) into an adaptor (12), said cartridge containing a rotatable supply reel of magnetic tape (14), characterized by the feature that:

said adapter (12) having an adaptor housing (13), said adaptor housing having a fixed adaptor housing surface (81) for receiving a tether band (10) into engagement;

said adaptor (12) having a cartridge cavity (9) for receiving said cartridge (10);

said adaptor (12) having a take-up reel (18) mounted for rotation within said adaptor housing (13);

said tether band (16) coupled to said take-up reel (18) and extending from the location of said take-up reel (18) to a position proximate said cartridge cavity (9) for coupling said tape to said take-up reel;

said adaptor (12) having a tether connector keeper assembly (22) located proximate said cartridge cavity (9), said tether connector keeper assembly (22) for engaging said tether band (16) with said fixed adaptor housing surface (81) when said cartridge (10) is outside of said adaptor (12) defining a first keeper position, and for releasing said tether band (16) when said cartridge (10) is inside said cartridge cavity (9), defining a second keeper position.

2. The two-piece videocassette of claim 1 wherein said tether connector keeper assembly (22) comprises:

a keeper block (70) slidably mounted within said adaptor housing (13) and located at a first keeper location for engaging said tether band (16) and for positioning said tether band (16) at a fixed location in abutment with said fixed adaptor housing surface (81) with respect to said housing (13), when said cartridge (10) is outside of said adaptor (12), wherein abutment between said tether band (16) and said fixed adaptor housing surface (81) define said first keeper location.

3. The two-piece videocassette of claim 2 wherein said tether connector keeper assembly (22) further comprises:

a compression spring (79) for biasing said keeper block (70) into engagement with said tether band (16) when said keeper block (70) is in said first keeper location.

4. The two-piece videocassette of claim 3 wherein said tether connector keeper assembly (22) further comprises:

a release ramp (71) located on said keeper block (70) for engaging said cartridge (10) upon insertion of said cartridge (10) into said cartridge cavity (9) thereby compressing said compression spring (79) to move said keeper block (70) into a second keeper location, corresponding to the release of said tether band (16) from abutment with said fixed adaptor housing surface (81).

* * * * *

UNITED STATES PATENT AND TRADEMARK OFFICE
CERTIFICATE OF CORRECTION

PATENT NO. : 5,188,309

DATED : February 23, 1993

INVENTOR(S) : Jerrold K. Weeks

It is certified that error appears in the above-identified patent and that said Letters Patent is hereby corrected as shown below:

Column 3, line 19, please delete the words "video tape" and insert therefor --videotape--

Column 3, line 35, please delete the words "on to" and insert therefor --onto--

Column 4, line 1, please delete the word "pre-determined" and insert therefor --predetermined--

Column 4, line 23, after the word "that", please insert the word --the--

Column 4, line 43, please delete the words "take up" and insert therefor --take-up--

Column 4, line 45, please delete the words "take up" and insert therefor --take-up--

UNITED STATES PATENT AND TRADEMARK OFFICE
CERTIFICATE OF CORRECTION

PATENT NO. : 5,188,309

DATED : February 23, 1993

INVENTOR(S) : Jerrold K. Weeks

It is certified that error appears in the above-identified patent and that said Letters Patent is hereby corrected as shown below:

Column 5, line 58, please delete the word "FIG." and substitute therefor --FIGS.--

Column 6, line 40, after the word "from" and before the word "their", please delete the word "the"

Column 7, line 8, please delete the word "overly" and substitute therefor --lie over--

Column 7, line 29, after the word "on", please insert the word --the--

Column 8, line 15, in claim 1, please delete "(10)" and substitute therefor --(16)--

Signed and Sealed this

Twenty-eighth Day of December, 1993

Attest:

BRUCE LEHMAN

*Attesting Officer*  *Commissioner of Patents and Trademarks*